Sept. 27, 1927.   J. W. ISEMAN   1,643,771
RIVET
Filed Dec. 30, 1926

WITNESSES

INVENTOR
John W. Iseman
BY
ATTORNEYS

Patented Sept. 27, 1927.

1,643,771

UNITED STATES PATENT OFFICE.

JOHN W. ISEMAN, OF BROOKLYN, NEW YORK, ASSIGNOR OF FIFTY PER CENT TO JOHN D. SMALL, OF NEW YORK, N. Y.

RIVET.

Application filed December 30, 1926. Serial No. 158,039.

The present invention relates to a rivet construction having a wide range of utility, but which is particularly adapted for use in connection with aircraft construction. In such construction a great number of light duralumin rivets are used for riveting duralumin sheets together. This riveting operation is an expensive one, and frequently a difficult one, inasmuch as each of the little rivets must be "backed" and clinched in the usual manner and such a riveting operation usually calls for the services of two men. The "backing" of the rivets for instance, in the construction of pontoons for seaplanes is an exceedingly awkward and difficult operation.

In accordance with the present invention, I provide an automatically self-heading rivet which requires no "backing", and which may be applied by one man very expeditiously. The rivets are strong and offer a high margin of safety when used. It will be apparent that they are particularly advantageous for use in connection with pontoons or other enclosures such as tubing, inasmuch as they will permit all of the riveting to be carried on from the outside, and obviate the necessity for someone to crawl inside of the pontoon or of reaching into the enclosure to "back" the rivets as they are driven.

The rivets embodying this invention also form an effective seal so that liquid cannot leak through or around them when used in pontoon construction or the like, and the rivets are also fully self-heading so as to produce an effective clinching head. They embody a simple unitary assembly of inexpensive construction, and effect a great economy of time and labor.

Further and more specific objects, features and advantages will clearly appear from the detailed description given below taken in connection with the accompanying drawings which form a part of this specification.

In the accompanying drawings—

Figure 1:
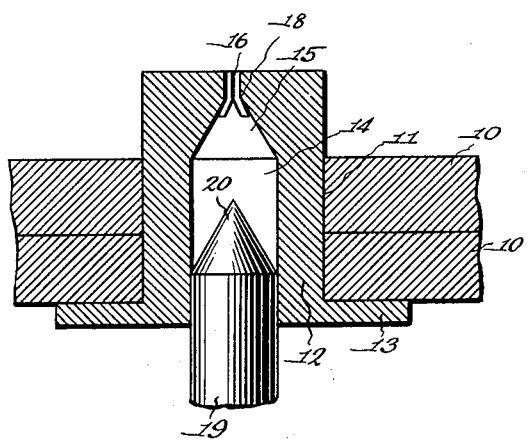
Fig. 1 is a view in longitudinal section showing a rivet embodying the present invention inserted into an opening in a pair of plates to be joined, the driving pin of the rivet being shown in elevation, and in the position which it assumes prior to being driven home.
Figure 3:
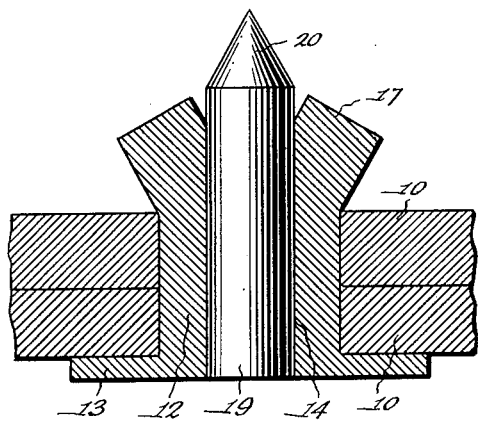
Fig. 3 is a view similar to Fig. 1, but showing the driving pin in its final position.
Figure 2:
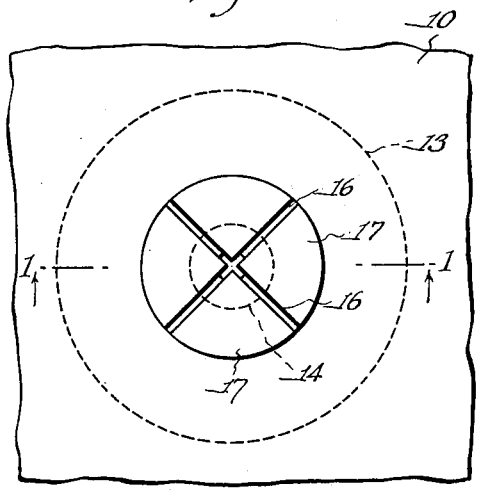
Fig. 2 is a view of the inside face of the plates.
Figure 4:
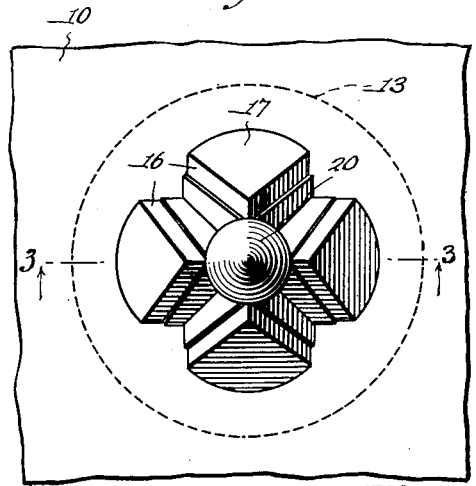
Fig. 4 is a view similar to Fig. 2, but showing the rivet in applied position.

In the drawings I have used the reference characters 10, 10 to designate a pair of plates to be riveted together, these plates having aligned openings 11 therein which define a rivet hole into which an outer sleeve 12 of my improved rivet is inserted. The sleeve 12 may be formed with a thin and flat flange 13 at its head end, and with a cylindrical bore 14 extending approximately from the outer end of the rivet to the plane of the inner face of the inner plate 12. From this point, the bore 14 tapers, producing the conical cavity 15. Several intersecting transverse slots 16 may be cut in the inner end of the member 12. The slots 16 are preferably relatively narrow. I have shown two diametrically cut slots 16 which may intersect each other substantially at right angles, and which are cut deeply enough to intersect the apex of the conical cavity 15.

The slots 16 and the bore 15 define a series of bendable segmental portions 17 adapted to be spread apart and bent outwardly to comprise a clinching portion.

A pin 19 of the proper shape and size to be drive fitted into the bore 14 may be formed with a conical or wedge-like inner end 20 which may be tapered substantially in accordance with the taper of the conical cavity 15. The pin 19 is fitted into the bore with a drive fit throughout at least the major portion of the length of the sleeve, so as to form an effective sealing means for plugging the interior of the sleeve and for other purposes hereinafter mentioned, and accordingly water or other liquids cannot leak through the rivet around the pin. The act of driving the pin 19 into the sleeve expands the sleeve and brings it into close contact with the sides of the rivet hole 11.

In the manufacture of the rivets, the sleeve portions 12 and the pins 19 are preferably assembled by driving or forcing the pins part way into the bore 14 as shown in Fig. 1, so as to form an extended but unitary assembly which is easily manipulated by the user, and may be quickly placed in position in the rivet holes notwithstanding the thin flat head portion. The extended pin provides a convenient portion to grasp even though the rivet may be of quite small dimensions. By reason of the drive fit the pin is thus held from the time of manufacture of the rivet until the same is located in its used position. Numerous small rivets thus uniformly assembled may be very rapidly applied to the work by simple uniform motions and the operative does not have to search for a suitable pin or insert the same after placing the sleeve in position. This is a particularly important consideration where rivets of various sizes or types are being applied by one workman. When applying the rivets, they are merely inserted in proper rivet holes and each pin need be struck but once with a predetermined blow to drive it inwardly until its outer end lies flush with the outer face of the flange 13. In driving in the pins 19, the segmental portions 17 will be separated and bend radially outwardly until the walls of the cavity 15 are straightened out and disposed at least in part, in positions substantially in alignment with the walls of the bore 14.

The pin after being driven home is securely wedged in position by the clinching portion in addition to being retained by reason of the drive fit.

The segments 17 bend outwardly about the edges of plate 10 at the aperture 11 and thus secure the sleeve against movement and at the same time the bases of the segmental portions 17 come into water-tight engagement with the inner plate 10.

Both portions of the rivets may be made of duralumin or other suitable metal.

It is not intended to limit the invention to the details or examples herein described since it will be obvious to those skilled in the art, after understanding the invention, that various modifications and substitutions may be made without departing from the scope of the invention, and it is desired therefore in the appended claims to cover all such modifications.

What is claimed as new and desired to be secured by Letters Patent of the United States is:

1. As an article of commerce, a rivet comprising a hollow sleeve having a flanged head portion at one end and a clinching portion at its other end, and a pin member for plugging the interior of said sleeve and for operating said clinching portion from the head end of the rivet, said pin member fitting said sleeve with a drive fit throughout at least the major part of the length of the sleeve, the pin being forced a distance part way into said sleeve at the head end and there carried by the rivet prior to its use, to provide an extended unitary assembly easily manipulated by the user and ready for the pin to be driven home by a predetermined blow.

2. As an article of commerce, a rivet comprising a hollow sleeve having a flanged head portion at one end and a clinching portion at its other end, and a pin member for plugging the interior of said sleeve and for operating said clinching portion from the head end of the rivet, said pin member fitting said sleeve with a drive fit throughout at least the major part of the length of the sleeve to expand the rivet within the opening in which the same is fitted to form a tight joint.

3. As an article of commerce, a rivet of relatively small dimensions comprising a hollow sleeve having a thin and flat flanged head portion at one end and a clinching portion at its other end, and a pin member for plugging the interior of said sleeve and at the same time operating said clinching portion from the head end of the rivet, said pin member fitting said sleeve with a drive fit throughout at least the major part of the length of the sleeve, the pin being forced a distance part way into said sleeve at the head end and there carried by the rivet prior to its use, to provide an extended unitary assembly easily manipulated by the user.

JOHN WYCLIFFE ISEMAN.